(12) United States Patent
Hasegawa et al.

(10) Patent No.: US 6,404,588 B1
(45) Date of Patent: Jun. 11, 2002

(54) THIN FILM MAGNETIC HEAD HAVING MAGNETIC YOKE LAYER CONNECTED TO MAGNETIC YOKE PIECE OF REDUCED WIDTH

(75) Inventors: Minoru Hasegawa; Syuji Nishida, both of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/426,089

(22) Filed: Oct. 22, 1999

(30) Foreign Application Priority Data

Apr. 23, 1999 (JP) .......................................... 11-115937

(51) Int. Cl.[7] .............................................. G11B 5/187
(52) U.S. Cl. ...................................... 360/126; 360/122
(58) Field of Search ................................ 360/122, 126, 360/317

(56) References Cited

U.S. PATENT DOCUMENTS

| | | | | |
|---|---|---|---|---|
| 5,761,014 A | * | 6/1998 | Urai et al. ................ | 360/126 |
| 6,072,670 A | * | 6/2000 | Furuichi et al. ............ | 360/126 |
| 6,122,144 A | * | 9/2000 | Chang et al. ............... | 360/122 |
| 6,130,805 A | * | 10/2000 | Sasaki et al. .............. | 360/126 |
| 6,209,192 B1 | * | 4/2001 | Urai et al. ................ | 29/603.14 |
| 6,289,578 B1 | * | 9/2001 | Kamijima ................ | 29/603.14 |
| 6,301,076 B1 | * | 10/2001 | Stageberg et al. .......... | 360/126 |
| 6,304,415 B1 | * | 10/2001 | Tateyama et al. .......... | 360/126 |

FOREIGN PATENT DOCUMENTS

| | | |
|---|---|---|
| JP | 628626 | 2/1994 |
| JP | 7110918 | 4/1995 |
| JP | 7296328 | 11/1995 |
| JP | 9016904 | 1/1997 |
| JP | 10326405 | 12/1998 |

* cited by examiner

Primary Examiner—Jefferson Evans
(74) Attorney, Agent, or Firm—Greer, Burns & Crain, Ltd.

(57) ABSTRACT

A thin film magnetic head comprises a magnetic yoke piece exposed at a medium-opposed surface adjacent a gap layer. A magnetic yoke layer is connected to the magnetic yoke piece at a position retracting from the medium-opposed surface. The tip end of the magnetic yoke layer is exposed at the medium-opposed surface. A non-magnetic layer is interposed between the tip end of the magnetic yoke layer and the magnetic yoke piece at the medium-opposed surface. The non-magnetic layer serves to space the tip end of the magnetic yoke layer away from the other magnetic yoke layer which is separated by the magnetic yoke piece and a gap layer, for example, from the magnetic yoke layer. It is possible to reduce a magnetic field directed to the other magnetic yoke layer from the edges of the magnetic yoke layer protruding in the lateral direction of a data track. Such magnetic fields from the magnetic yoke layer hardly induce magnetic reversal on a magnetic recording medium such as a magnetic recording disk or tape.

4 Claims, 6 Drawing Sheets

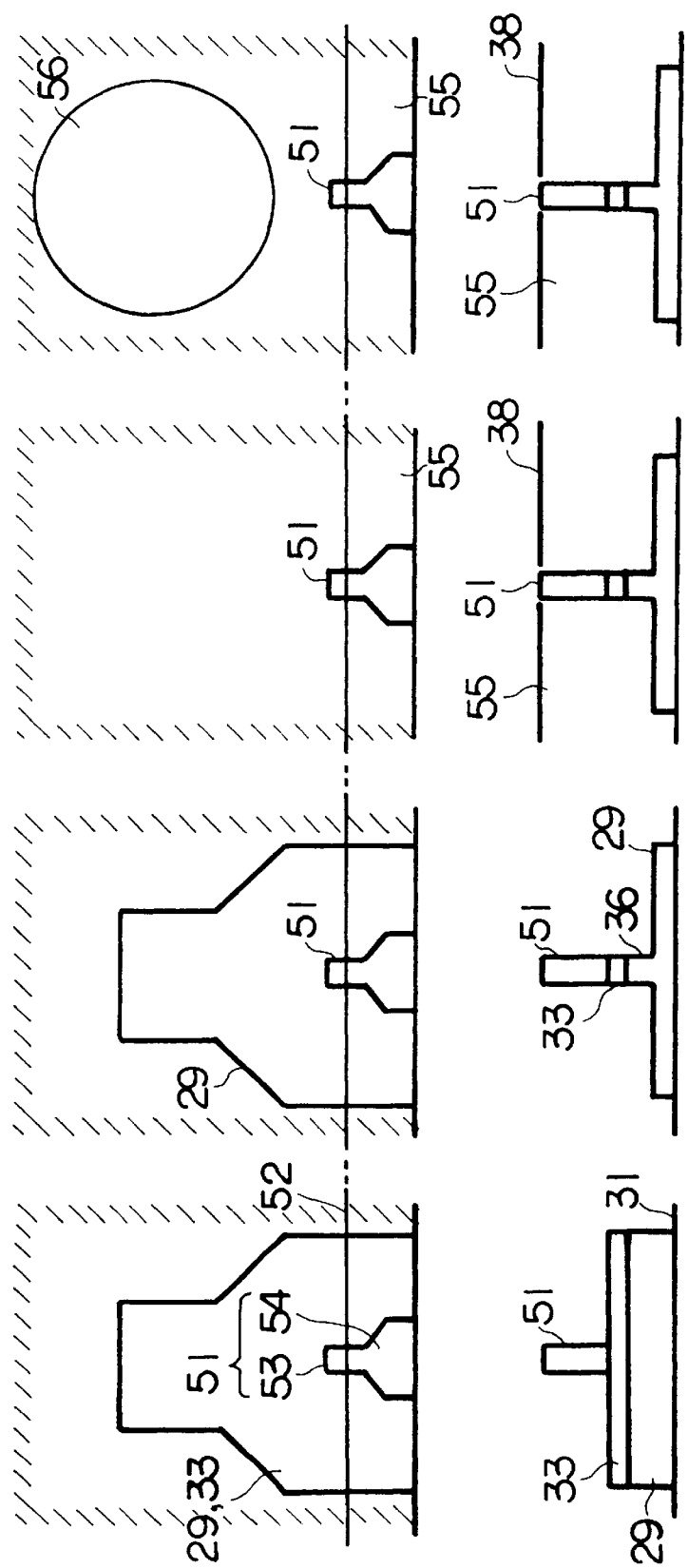

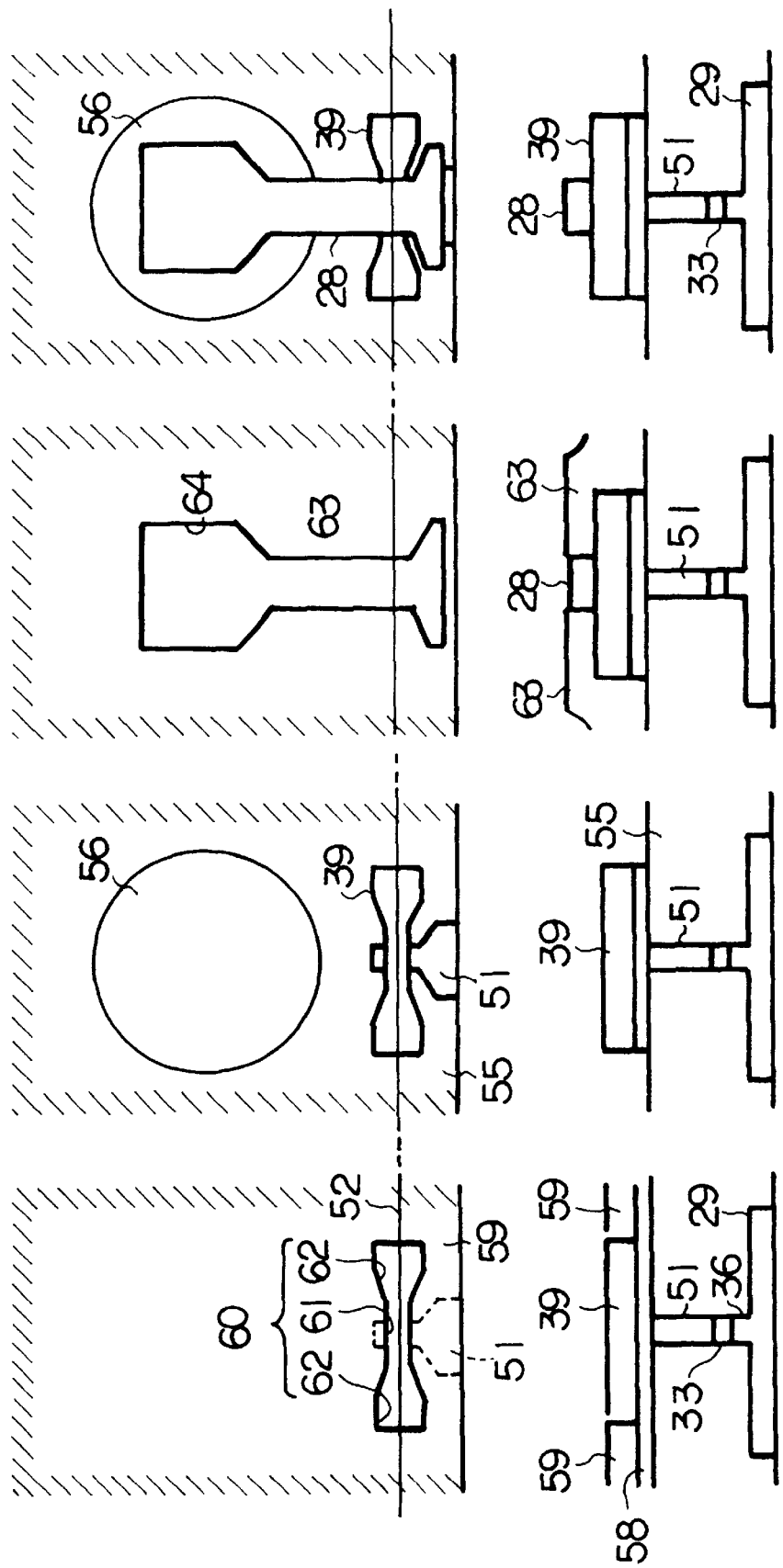

THIN FILM MAGNETIC HEAD HAVING MAGNETIC YOKE LAYER CONNECTED TO MAGNETIC YOKE PIECE OF REDUCED WIDTH

BACKGROUND OF THE INVENTION

1. Field of the Invention

The present invention relates to a thin film magnetic head employed in a magnetic disk drive and a magnetic tape storage system and the like. In particular, the invention relates to a thin film magnetic head comprising a magnetic yoke piece exposed at a medium-opposed surface adjacent a gap layer, and an upper or a lower magnetic yoke layer connected to the magnetic yoke piece, and to a method of producing the same.

2. Description of the Prior Art

Japanese Patent Laid-open No. 6-28626 discloses a well known thin film magnetic head comprising a lower front yoke layer swelling from the surface of the lower magnetic yoke layer toward the upper magnetic yoke layer, and an upper front yoke layer likewise swelling from the surface of the upper magnetic yoke layer toward the lower magnetic yoke layer. The upper and lower front yoke layers are designed to expose, at the medium-opposed surface or air bearing surface (ABS), tip ends narrower than that of the upper and lower magnetic yoke layers. Accordingly, the upper and lower front yoke layers are supposed to define a narrower write gap therebetween in the thin film magnetic head. The upper and lower front yoke layers are expected to achieve improvement in density of recording or data tracks on the magnetic recording medium such as a magnetic recording disk and a magnetic recording tape.

However, the aforementioned thin film magnetic head should accept extension of the upper magnetic yoke layer at the medium-opposed surface in the lateral direction of data track by a dimension wider than that of the upper front yoke layer. Accordingly, the thin film magnetic head usually suffers from a magnetic leakage from the protruding edges of the upper magnetic yoke layer at the medium-opposed surface. It has been revealed, contrary to expectation, that the aforementioned thin film magnetic head hardly contributes to reduction in width of a data track. Improvement in density of data tracks cannot thus be achieved.

SUMMARY OF THE INVENTION

It is accordingly an object of the present invention to provide a thin film magnetic head capable of reducing a magnetic leakage, obstructive to reduction in width of a data track, at a medium-opposed surface.

According to the present invention, there is provided a thin film magnetic head comprising: a magnetic yoke piece exposed at a medium-opposed surface adjacent a gap layer; a magnetic yoke layer connected to the magnetic yoke piece at a position retracting from the medium-opposed surface so as to expose its tip end at the medium-opposed surface; and a non-magnetic layer interposed between the tip end of the magnetic yoke layer and the magnetic yoke piece at the medium-opposed surface.

The non-magnetic layer serves to space apart the magnetic yoke piece and the tip end of the magnetic yoke layer from each other at the medium-opposed surface in the thin film magnetic head. The magnetic yoke layer can accordingly be kept away from the other magnetic yoke layer which is separated by the magnetic yoke piece and a gap layer, for example, from the magnetic yoke layer. It is possible to reduce a magnetic field directed to the magnetic yoke piece from the tip end of the magnetic yoke layer as well as a magnetic field directed to the other magnetic yoke layer from the edges of the magnetic yoke layer protruding in the lateral direction of a data track. Such magnetic fields from the magnetic yoke layer hardly induce magnetic reversal on a magnetic recording medium such as a magnetic recording disk or tape.

The magnetic yoke piece and the magnetic yoke layer may be an upper front yoke layer and an upper magnetic yoke layer of the thin film magnetic head. In this case, the tip end of the upper magnetic yoke layer can be spaced from the lower magnetic yoke layer which is separated by a gap layer from the upper front yoke layer and the upper magnetic yoke layer at the medium-opposed surface. It is possible to reduce a magnetic field directed to a magnetic recording medium from the edges of the upper magnetic yoke layer protruding in the lateral direction of a data track. Such magnetic field hardly induces magnetic reversal on the magnetic recording medium. A narrow magnetic field can reliably be defined by the upper front yoke layer narrower than the upper and lower magnetic yoke layers, so that the lateral width of a data track can be reduced.

A lower front yoke layer may also be formed to swell toward the upper front yoke layer along the medium-opposed surface from the surface o f the lower magnetic yoke layer. A narrower magnetic field can reliably be defined between the upper and lower front yoke layers both narrower than the upper and lower magnetic yoke layers. The lateral width of a data track can further be reduced.

A method of producing the aforementioned thin film magnetic head may comprise: forming a lower magnetic yoke layer on a surface of a wafer; forming an upper front yoke material layer extending rearward from a basic line above a surface of the lower magnetic yoke layer; forming a protection layer covering over the upper front yoke material layer; subjecting the protection layer to flattening process so as to expose the upper front yoke material layer; forming a resist covering over a rear end of the upper front yoke material layer so as to define a void pattern crossing the upper front yoke material layer along the basic line; depositing a non-magnetic layer within the void pattern in an electrolytic solution; and subjecting the wafer to grinding process along a plane including the basic line.

In general, it is difficult to form the upper magnetic yoke layer with its tip end retracting from the medium-opposed surface. When a photoresist is employed to define a void pattern corresponding to the shape of the upper magnetic yoke layer, for example, a developer hardly reaches a corner of the void pattern at the terminal end for defining the tip end of the upper magnetic yoke layer. The exposed photoresist cannot completely be washed out in the void pattern. Such void pattern only allows insufficient deposition for forming the tip end of the upper magnetic yoke layer in an electroplating process. The obtained upper magnetic yoke layer has a low dimensional accuracy.

On the other hand, when the void pattern is extended forward beyond the medium-opposed surface in forming the upper magnetic yoke layer, no corner is formed at the medium-opposed surface in the void pattern. It is accordingly possible to allow a developer to flow beyond the medium-opposed surface. The flow of a developer can be promoted. The exposed photoresist can completely be washed out in the void pattern corresponding to the tip end of the upper magnetic yoke layer. After the front end beyond the medium-opposed surface is cut off from the deposited upper magnetic yoke layer, the upper magnetic yoke layer of high dimensional accuracy can be obtained.

According to the aforementioned method, when the resist is removed after the deposition of the non-magnetic layer, the rear end of the upper front yoke material layer appears. The upper magnetic yoke layer is then formed to cover the rear end of the upper front yoke material layer and to extend forward beyond the basic line, so that the upper magnetic yoke layer can be formed with high dimensional accuracy in the vicinity of the basic line. In addition, when the medium-opposed surface is finally exposed after the grinding process, the non-magnetic layer serves to space the upper front yoke layer and the upper magnetic yoke layer from each other at the exposed medium-opposed surface, as described above. In this manner, the aforementioned thin film magnetic head can reliably be obtained. Moreover, management of the grinding amount in the grinding process may serve to control the depth of the non-magnetic layer spreading rearward from the medium-opposed surface.

Further, according to the method, a plane is defined to extend between the magnetic yoke piece and the magnetic yoke layer as a result of the flattening process to the protection layer. For example, an electric coil pattern may be formed on the plane. The plane allows the electric coil pattern to be designed finely. In addition, the plane also serves to achieve the formation of the non-magnetic layer with a high dimensional accuracy.

In realizing formation of the non-magnetic layer with a high dimensional accuracy, the void pattern is preferably provided with at least a stripe of an electrolytic solution passage extending along the basic line, and a pair of swelling reservoir connected to opposite ends of the electrolytic solution passage. Such void pattern may allow a developer, such as a tetramethylammonium hydroxide aqueous solution, to be smoothly introduced into the electrolytic solution passage from the swelling reservoir. It is accordingly possible to completely wash out the exposed resist within the narrow electrolytic solution passage. The void pattern can be formed with a high dimensional accuracy.

After the non-magnetic layer is formed in the above-described manner, the grinding process may be subjected to expose the medium-opposed surface. The thus obtained non-magnetic layer may comprise an interposed region extending on the plane in a lateral direction of a data track along the medium-opposed surface so as to define a predetermined depth from the medium-opposed surface, and a pair of extended regions connected to opposite ends of the interposed region so as to extend on the plane by a depth larger than the predetermined depth from the medium-opposed surface.

The aforementioned thin film magnetic head may be employed in combination with a magnetic read head such as a magnetoresistive (MR) sensor and a giant magnetoresistive (GMR) sensor. Not only a magnetic disk drive such as a hard disk drive (HDD) but also a magnetic tape storage system may employ the thin film magnetic head according to the present invention. Further, the thin film magnetic head may be supported not only on a flying head slider kept away from the surface of a magnetic recording medium, but also on a contact head slider comprising a medium-opposed surface which keeps contacting the surface of a magnetic recording medium.

BRIEF DESCRIPTION OF THE DRAWINGS

The above and other objects, features and advantages of the present invention will become apparent from the following description of the preferred embodiment in conjunction with the accompanying drawings, wherein:

FIGS. 9A to 9D illustrate plan views and end views along the basic line for explaining the method of producing the magnetic transducer; and FIGS. 10A to 10D illustrate plan views and end views along the basic line f or explaining the method of producing the magnetic transducer.

DESCRIPTION OF THE PREFERRED EMBODIMENT

Figure 1:
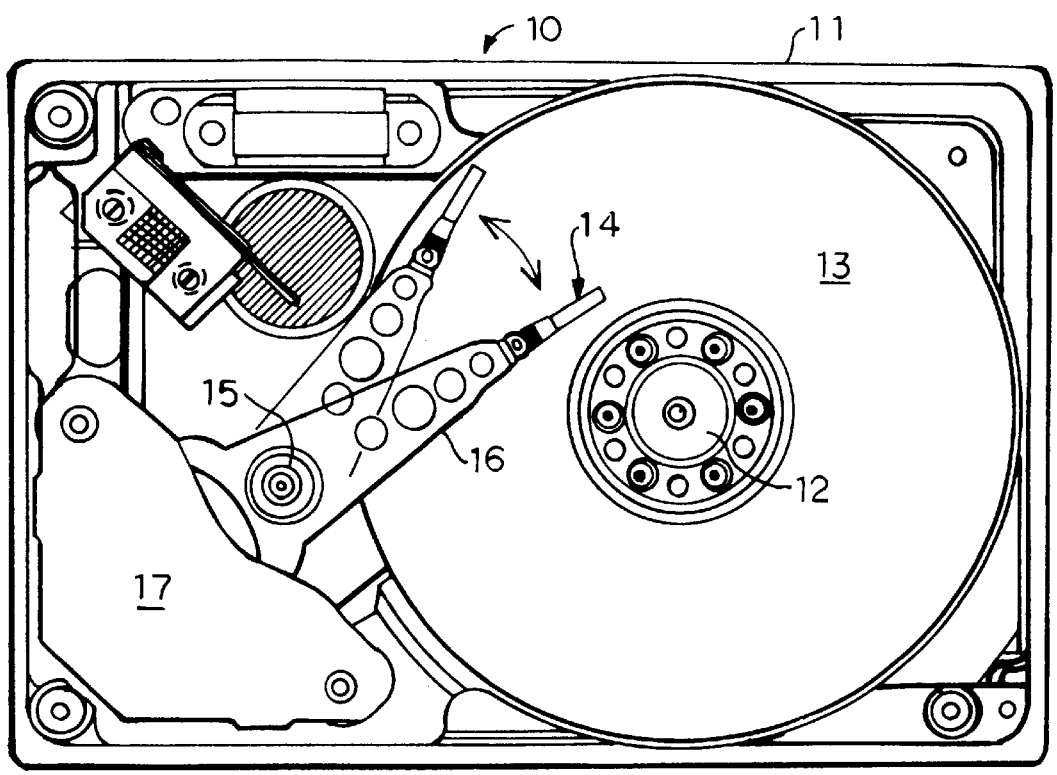
FIG. 1 is a plan view illustrating the interior structure of the hard disk drive (HDD)

FIG. 1 illustrates the interior structure of a hard disk drive (HDD) 10 as an example of a magnetic recording disk drive. An enclosure 11 of the HDD 10 contains a magnetic recording disk 13 mounted on a spindle motor 12, and a flying head slider 14 opposed to the disk surface of the magnetic recording disk 13. The flying head slider 14 is fixed at the tip end of a carriage arm 16 capable of swinging about a support axis 15. When information is read out of or written into the magnetic recording disk 13, the carriage arm 16 is driven for swinging movement by an actuator 17, comprising a magnetic circuit, so that the flying head slider 14 can be moved in the radial direction of the magnetic recording disk 13. Such radial movement is adapted to position the flying head slider 14 above a target recording or data track on the magnetic recording disk 13. The opening of the enclosure 11 may be closed with a cover, not shown.

Figure 2:
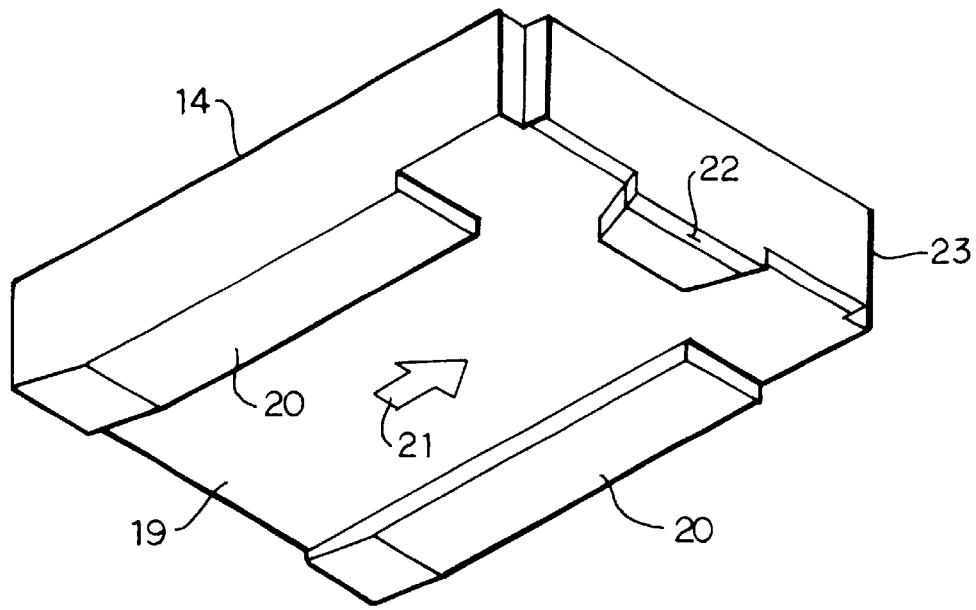
FIG. 2 is an enlarged perspective view illustrating an example of a flying head slider.

FIG. 2 illustrates an example of the flying head slider 14. The flying head slider 14 comprises a medium-opposed surface, namely, a bottom surface 19 opposed to the magnetic recording disk 13. The bottom surface 19 is provided with a pair of rails 20 designed to define an air bearing surface (ABS). The flying head slider 14 receives an air flow 21 at the bottom surface 19, in particular, at the ABS so as to fly above the disk surface of the rotating magnetic recording disk 13. During flight, the flying head slider 14 allows a magnetic transducer 22 exposed at the bottom surface 19 to read or write information data out of or into the magnetic recording disk 13. The magnetic transducer 22 is embedded in a transducer containing layer 23 made of $Al_2O_3$ formed at the outflow end of an $Al_2O_3$—TiC body, as described later in detail. It should be noted that the flying head slider 14 may take a form or shape other than the aforementioned one.

Figure 3:
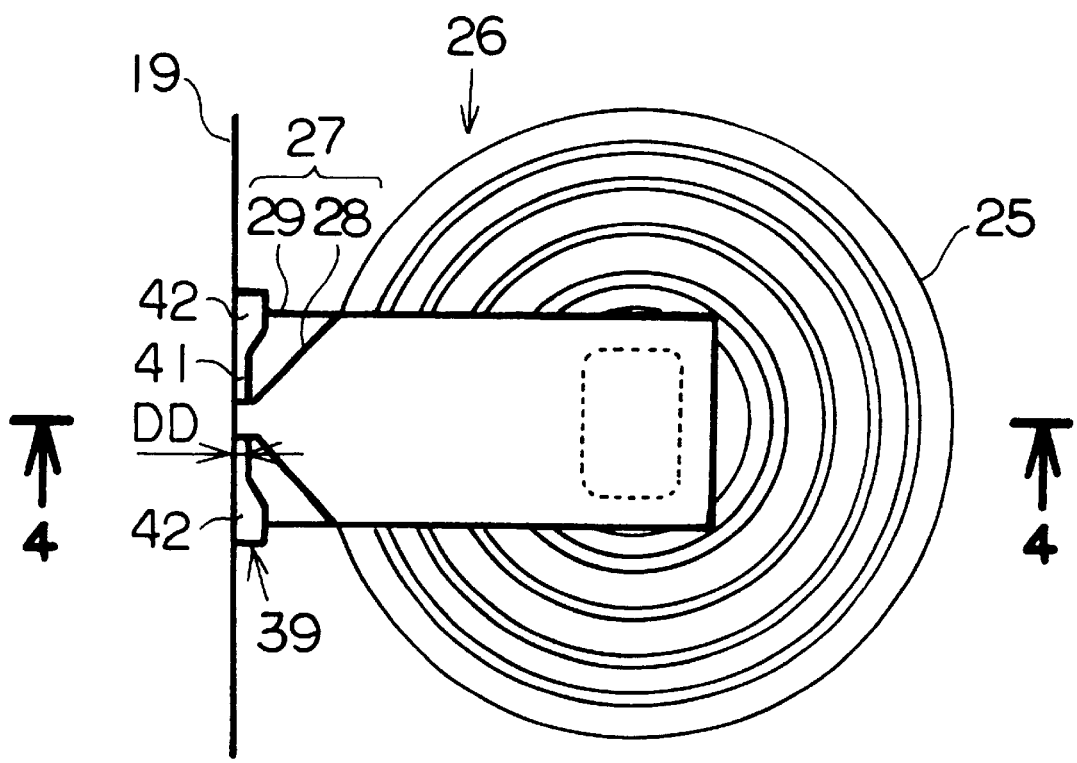
FIG. 3 is a plan view schematically illustrating the structure of a thin film magnetic head element in the magnetic transducer.

Description will be made on the structure of the magnetic transducer 22 referring to FIG. 3. The magnetic transducer 22 comprises a thin film magnetic head element or inductive write element 26 capable of recording binary data in the magnetic recording disk 13 by utilizing magnetic field generated at a swirly electric coil pattern 25. When the magnetic field is generated at the electric coil pattern 25, a magnetic flux runs in a core 27 penetrating through the center of the electric coil pattern 25.

Figure 4:
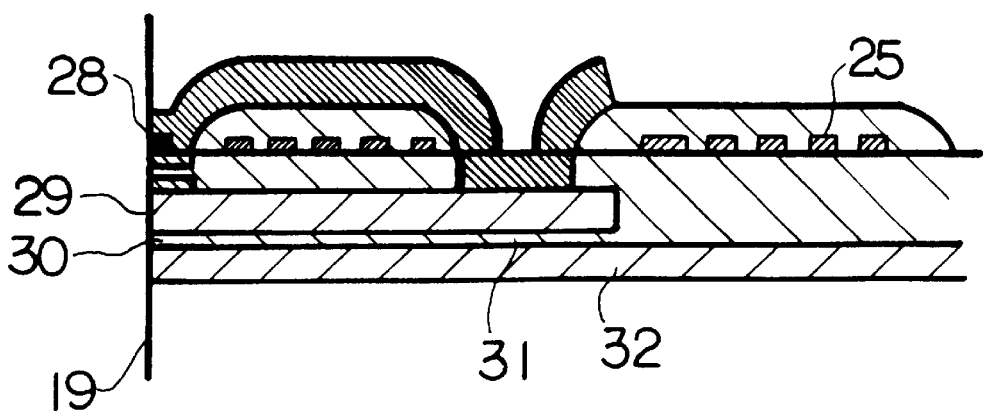
FIG. 4 is a partial sectional view taken along the line 4—4 in FIG. 3.

Referring also to FIG. 4, the core 27 comprises an upper pole or magnetic yoke layer 28 allowing its tip or front end to expose at the bottom surface 19, and a lower pole or magnetic yoke layer 29 likewise allowing its tip or front end to expose at the bottom surface 19. The electric coil pattern 25 is embedded between the upper and lower magnetic yoke layers 28, 29. The upper and lower magnetic yoke layers 28, 29 are connected to each other at the center of the electric coil pattern 25. The upper and lower magnetic yoke layers 28, 29 may be made of NiFe, for example. The magnetic transducer 22 employs a magnetoresistive (MR) sensor 30 as a read head element. The MR sensor 30 is embedded in an $Al_2O_3$ layer 31 between the lower magnetic yoke layer 29 and a lower shield layer 32 made of FeN or NiFe. The lower magnetic yoke layer 29 functions as an upper shield layer for the MR sensor 30, so that the lower magnetic yoke layer 29 extends wider than the upper magnetic yoke layer 28 at the tip or front end of the thin film magnetic head element 26 near the bottom surface 19. It should be noted that the magnetic transducer 22 may employ the other types of read head element such as a giant magnetoresistive (GMR) sensor and the like in place of the MR sensor 30, or may employ the aforementioned thin film magnetic head element 26 without a read head element.

Next, description will be made on the detailed structure of the thin film magnetic head element 26 referring to an enlarged view illustrated in FIG. 5. The thin film magnetic head element 26 comprises a magnetic yoke piece or upper front yoke layer 34 opposed to the tip end of the lower magnetic yoke layer 29. A non-magnetic gap layer 33 is interposed between the upper front yoke layer 34 and the tip end of the lower magnetic yoke layer 29 at the bottom surface 19. The upper magnetic yoke layer 28 is received on the upper front yoke layer 34 at a position retracting from the bottom surface 19. On the other hand, a lower front yoke layer 36 is formed on the lower magnetic yoke layer 29 so as to swell toward the upper front yoke layer 34 from a boundary plane 35 along the bottom surface 19, as shown in FIG. 6.

The magnetic flux transmitted in the core 27 is allowed to run around the gap layer 33 between the upper and lower front yoke layers 34, 36 in the thin film magnetic head element 26. The magnetic flux forms a magnetic field 37 leaking out at the bottom surface 19 as shown in FIG. 6. The leaking magnetic field serves to magnetize the magnetic recording disk 13 opposed to the bottom surface 19. Employment of the narrow upper and lower front yoke layers 34, 36 in this manner serve to realize a narrower write gap, so that a recording or data track on the magnetic recording disk 13 may have a lateral dimension or width narrower than that achieved by the upper and lower magnetic yoke layers 28, 29.

Figure 5:
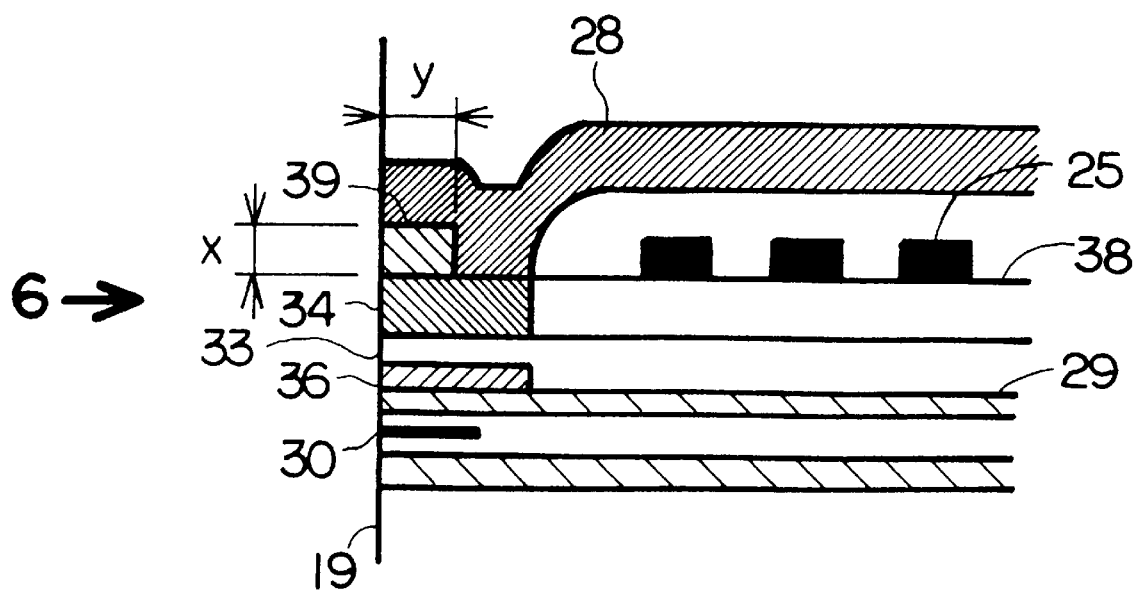
FIG. 5 is an enlarged sectional view illustrating a part of FIG. 4.

In addition, a non-magnetic layer 39 is formed on a plane 38 defined between the upper front yoke layer 34 and the upper magnetic yoke layer 28 in the thin film magnetic head element 26 as shown in FIG. 5. The non-magnetic layer 39 is interposed between the tip or front end of the upper magnetic yoke layer 28 and the upper front yoke layer 34 at the bottom surface 19. Moreover, the non-magnetic layer 39 comprises, as shown in FIG. 3, an interposed region 41 extending along the bottom surface 19 in the lateral direction of a data track, and a pair of extended regions 42 connected to opposite ends of the interposed region 41. The extension of the interposed region 41 on the plane 38 is terminated at a predetermined depth DD from the bottom surface 19. The extended regions 42 are designed to extend on the plane 38 so as to increase a depth, which is normally larger than the predetermined depth DD, from the bottom surface 19, as the regions 42 recede from the ends of the interposed region 41 in the lateral direction of a data track.

Figure 6:
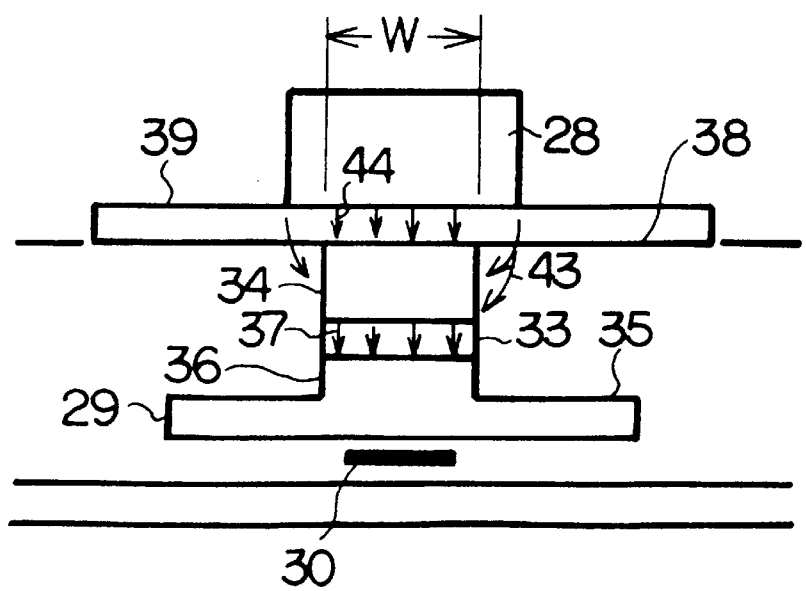
FIG. 6 is a front view illustrating the thin film magnetic head element observed from the direction of the arrow 6 in FIG. 5.

As is apparent from FIG. 6, the non-magnetic layer 39 serves to keep the upper front yoke layer 34 away from the upper magnetic yoke layer 28 at the bottom surface 19. Accordingly, less magnetic flux may leak out at the bottom surface 19 from the upper magnetic yoke layer 28. In particular, a magnetic field 43 leaking out from the protruding edges 28a of the upper magnetic yoke layer 28 can be reduced. It is possible to avoid magnetic reversal, which is usually induced by such magnetic field 43, on the disk surface of the magnetic recording disk 13. A data track of a narrow width W can reliably be achieved between the upper and lower front yoke layers 34, 36 without interference of the magnetic field 43 leaking out from the edges 28a of the upper magnetic yoke layer 28. The extended regions 42 of the non-magnetic layer 39 achieves an important roll in the method of producing the thin film magnetic head element 26 as described later in detail.

Next, the characteristic of the thin film magnetic head element 26 will be considered. As shown in FIG. 6, for example, the upper and lower front yoke layers 34, 36 with the gap layer 33 interposed therebetween are designed to generate the magnetic field 37 at the write gap. At the same time, the magnetic field 43 leaks out at the bottom surface 19 from the protruding edges 28a of the upper magnetic yoke layer 28. Both the magnetic fields 37, 43 are directed to the disk surface of the magnetic recording disk 13. In addition, it has been revealed that the non-magnetic layer 39 serves to induce a magnetic field 44 at an additional gap inevitably generated between the tip end of the upper magnetic yoke layer 28 and the upper front yoke layer 34 at the bottom surface 19. The magnetic field 44 is also directed to the disk surface of the magnetic recording disk 13.

As conventionally known, the thin film magnetic head element 26 requires the magnetic field 37 of approximately 6000Oe at the write gap, since magnetic recordation in general requires a magnetic field twice as much as a magnetic coercive force Hc (=3000Oe) of a recording medium such as the magnetic recording disk 13. The magnetic field 37 at the write gap may be determined by controlling the magnitude of electric current introduced in the electric coil pattern 25 and the dimensions of the upper and lower front yoke layers 34, 36. On the other hand, a magnetic field half as much as a magnetic coercive force Hc is known to cause magnetic reversal on a recording medium. The magnetic fields 43, 44 at the edges 28a and the additional gap should be suppressed below approximately 1500Oe near the disk surface of the magnetic recording disk 13. For example, if the magnetic field 43 exceeds 1500Oe at the edges 28a of the upper magnetic yoke layer 28, a recording or data track may be blurred so that a narrower data track cannot be obtained on the disk surface of the magnetic recording disk 13. Recording density cannot be improved. Otherwise, if the magnetic field 44 exceeds 1500Oe at the additional gap between the tip end of the upper magnetic yoke layer 28 and the upper front yoke layer 34, the magnetization achieved by the write gap may be reversed under the influence of the magnetic field 44 at the additional gap, since the non-magnetic layer 39 runs after the gap layer 33 above the disk surface of the magnetic recording disk 13.

Here, the magnetic fields 37, 43, 44 induced in the thin film magnetic head element 26 has been considered using a conventional computer software for simulating generation of a three-dimensional magnetic field. When the thickness X on the plane 38 is varied for the non-magnetic layer 39, the simulation has revealed the result illustrated in FIG. 7, for example. The non-magnetic layer 39 has a constant depth y (=DD) of 0.5 µm in this simulation. According to the simulation, the magnetic fields 43, 44 at the edges 28a and the additional gap can simultaneously be suppressed below 15000e if the thickness X of the non-magnetic layer 39 is set equal to or larger than 1.0 µm. The thickness X equal to or larger than 1.0 µm for the non-magnetic layer 39 is supposed to reliably avoid magnetic reversal to be induced by the magnetic fields 43, 44 at the edges 28a and the additional gap. A data track of a narrower lateral dimension or width W can reliably be obtained by cooperation of the upper and lower front yoke layers 34, 36.

Figure 7:
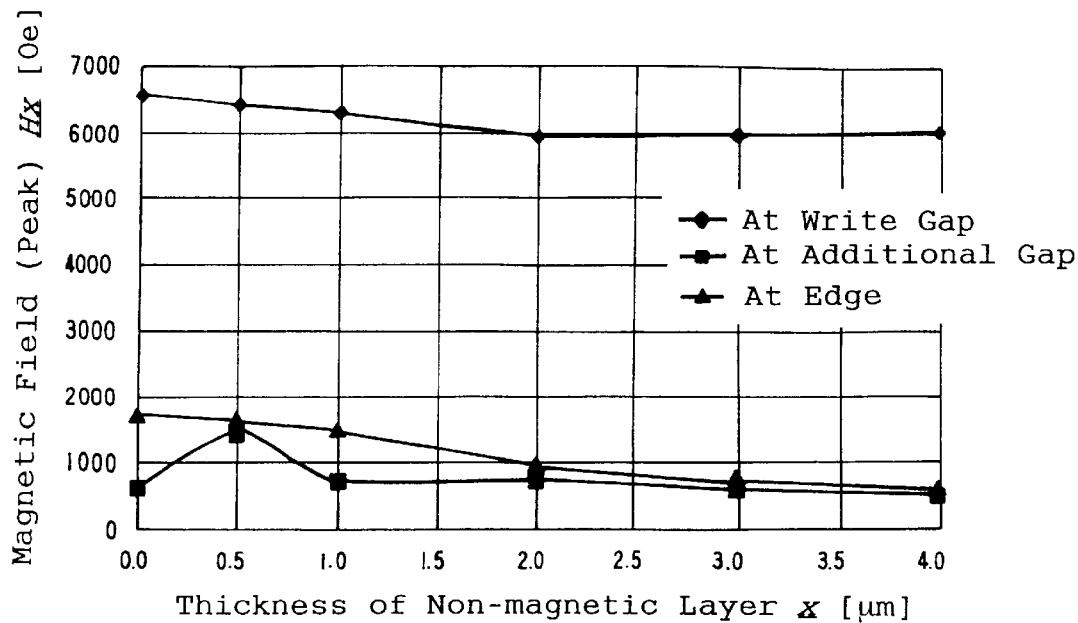
FIG. 7 is a graph illustrating the relationship between the thickness of the non-magnetic layer and the respective magnetic fields.
Figure 8:
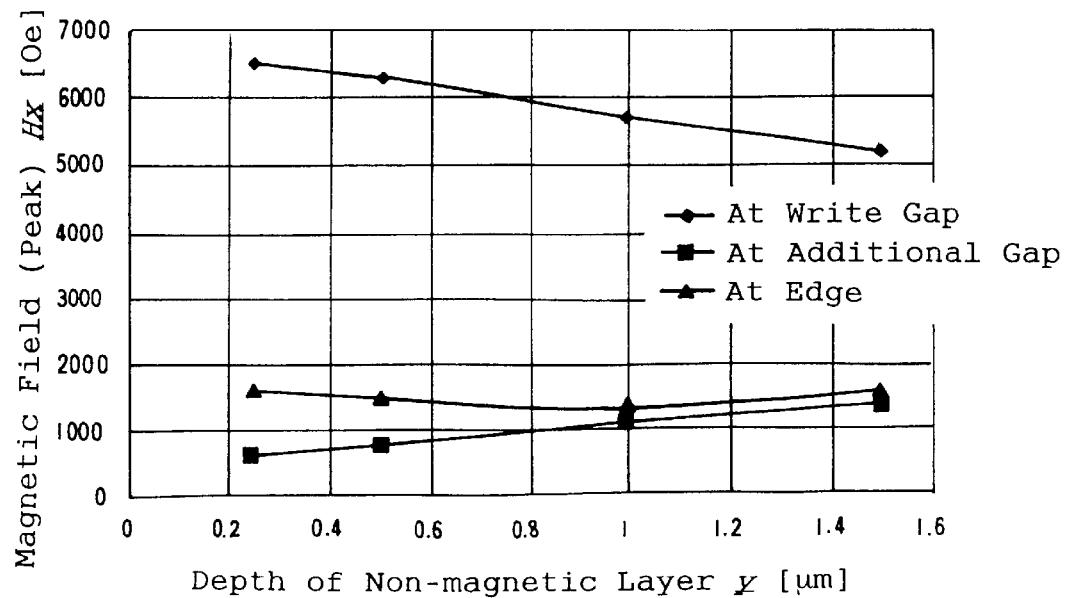
FIG. 8 is a graph illustrating the relationship between the depth of the non-magnetic layer and the respective magnetic fields.

When the depth y (=DD) is likewise varied for the non-magnetic layer 39, the simulation has revealed the result illustrated in FIG. 8, for example. The non-magnetic layer 39 has a constant thickness x of 1.0 µm in this simulation. According to the simulation, the magnetic fields 43, 44 at the edges 28a and the additional gap can simultaneously be suppressed below 15000e if the depth y of the non-magnetic layer 39 is set between 0.5 µm and 1.3 µm. The depth y between 0.5 µm and 1.3 µm for the non-magnetic layer 39 is supposed to reliably avoid magnetic reversal to be induced by the magnetic fields 43, 44 at the edges 28a and the additional gap. It should be noted that the characteristics revealed in the simulation as shown in FIGS. 7 and 8 may depend upon the material and/or the magnetic permeability of the upper front yoke layer 34 and the upper magnetic yoke layer 28.

Next, description will be made on a method of producing the aforementioned magnetic transducer 22. The lower shield layer 32, the $Al_2O_3$ layer 31 containing the MR element 30, and the upper shield layer or lower magnetic yoke layer 29 are sequentially formed on the surface of a wafer of $Al_2O_3$—TiC with $Al_2O_3$ lamination according to a conventional method. The non-magnetic gap layer 33 is laminated or formed on the lower magnetic yoke layer 29, as shown in FIG. 9A. The upper front yoke material layer 51 is formed on the non-magnetic gap layer 33 by electroplating. The upper front yoke material layer 51 comprises a narrow body 53 of a constant width extending rearward so as to cross a basic line 52, and an auxiliary wide body 54 connected to the front end of the narrow body 53 so as to extend forward with the lateral width gradually increased. When a void pattern in the from of such auxiliary wide body 54 is defined in a resist, such as a photoresist, laminated over the non-magnetic gap layer 33, the void pattern serves to smoothly introduce a developer, such as a tetramethylammonium hydroxide aqueous solution, into the void space corresponding to the narrow body 53. It is accordingly possible to completely wash out the resist within the void space for defining the narrow body 53. The void pattern for the narrow body 53 can be formed in the resist with high dimensional accuracy. The narrow body 53 of high dimensional accuracy can finally be obtained.

As shown in FIG. 9B, the wafer is subjected to ion milling process. The upper front yoke material layer 51 functions as a mask during the ion milling process. The ion milling process in this way is designed to remove the non-magnetic gap layer 33 off the contour of the upper front yoke material layer 51. The lower front yoke layer 36 can also be shaped out of the lower magnetic yoke layer 29 during the ion milling process. The lower front yoke layer 36 has a shape corresponding to that of the upper front yoke material layer 51.

Thereafter, an $Al_2O_3$ protection layer is formed to completely cover over the upper front yoke material layer 51 by deposition or sputtering process. The protection layer is subjected to flattening process, such as grinding and polishing, so as to expose the upper front yoke material layer 51 once embedded in the protection layer 55, as shown in FIG. 9C. Grinding or polishing such as CMP (chemical mechanical polishing) may be employed as flattening process, for example. The aforementioned plane 38 is defined in this flattening process. The electric coil pattern 25 is then formed or deposited on the plane 38. The plane 38 allows the electric coil pattern 25 to be designed finely. An insulation layer 56 is subsequently formed to fill the space between the electric coil pattern 25, as shown in FIG. 9D.

An electroplating base layer 58 is formed over the surface of the wafer by sputtering and the like. A resist such as a photoresist is formed or laminated on the surface of the electroplating base layer 59. As shown in FIG. 10A, the resist 59 covers over the rear end of the upper front yoke material layer 51 so as to define a void pattern 60 crossing the upper front yoke material layer 51 along the basic line 52. The void pattern 60 is provided with at least a stripe of an electrolytic solution passage 61 extending along the basic line 52, and a pair of swelling reservoir 62 connected to opposite ends of the electrolytic solution passage 61. According to the resist 59, a developer, such as a tetramethylammonium hydroxide aqueous solution, can smoothly be introduced into the electrolytic solution passage 61 through the swelling reservoir 62. It is accordingly possible to completely wash out the resist 59 within the narrow electrolytic solution passage 61. The void pattern 60 can be formed in the resist 59 with high dimensional accuracy.

The non-magnetic layer 39 is then deposited within the void pattern 60 in an electrolytic solution. Subsequently, the resist 59 and the electroplating base layer 58 are removed around the non-magnetic layer 39 as shown in FIG. 10B. The upper front yoke material layer 51 and the insulation layer 56, which has been covered with the resist 59 and the electroplating base layer 58, are again exposed at the surface of the wafer.

Another electroplating base layer, not shown, is then formed over the surface of the wafer. A resist 63 such as a photoresist is formed on the electroplating base layer as shown in FIG. 10C. The resist 63 defines a void pattern 64 extending in the direction orthogonal to the base line 52. The void pattern 64 has a width larger than that of the narrow body 53 of the upper front yoke material layer 51 in the lateral direction. The upper magnetic yoke layer 28 is then deposited within the void pattern 64 in an electrolytic solution. The resist 63 and the electroplating base layer are subsequently removed around the upper magnetic yoke layer 28 as shown in FIG. 10D. Thereafter, the surface of the wafer is covered with an $Al_2O_3$ protection layer. The transducer containing layer 23 can be obtained in the aforementioned manner.

The wafer is then divided into pieces each comprising the magnetic transducer 22. The bottom surface 19 is sculptured at the exposed surface defined by cutting plane on the piece in accordance with a conventional method. Prior to formation of the bottom surface 19, the exposed surface is subjected to flattening process such as grinding or polishing along the base line 52. The exposed surface is defined by a plane including the base line 52. The front end of the piece, divided by the plane including the base line 52, is cut off from the piece. The magnetic transducer 22 accordingly appears at the exposed surface along the plane, namely, at the bottom surface 19, as shown in FIG. 10D. The depth y of the non-magnetic layer 39 depends upon the position of the base line 52.

The above-described method of production may employ any of Au, Ag, Cu, Bi, Cd, Pb, Pd, Pt, Rh, Sn and Zn as well as an alloy of any combination in electroplating to form the non-magnetic layer 39. In particular, in case where Cu is selected in electroplating the non-magnetic layer 39, it is preferable to suppress or reduce waste of Cu generated out of the non-magnetic layer 39 in the subsequent flattening process. The aforementioned non-magnetic layer 39 defined by the narrow void pattern 60, in particular by the electrolytic solution passage 61, serves to suppress waste generated out of the non-magnetic layer 39. It should be noted that a wider void pattern may be employed in place of the narrow void pattern 60 when a proper material is applied in electroplating in place of Cu.

The aforementioned magnetic transducer 22 may be employed in a magnetic recording disk drive other than the HDD 10 and a magnetic tape storage system. The magnetic transducer 22 may also be employed in a contact head slider comprising a medium-opposed surface which keeps contacting a recording medium such as a magnetic recording disk.

What is claimed is:

1. A thin film magnetic head comprising:

an upper magnetic pole; and a lower magnetic pole, wherein at least one of the upper and lower magnetic poles includes a magnetic yoke piece of a first lateral width exposed at a medium-opposed surface adjacent a gap layer;

a magnetic yoke layer connected to the magnetic yoke piece at a position retracting from the medium-opposed surface, a tip end of said magnetic yoke layer being exposed at the medium-opposed surface over a second lateral width larger than the first lateral width; and a non-magnetic layer interposed between the tip end of the magnetic yoke layer and the magnetic yoke piece at the medium-opposed surface.

2. The thin film magnetic head according to claim 1, wherein a plane is defined to extend between the magnetic yoke piece and the magnetic yoke layer.

3. The thin film magnetic head according to claim 2, wherein the non-magnetic layer comprises an interposed region extending on the plane in a lateral direction of a data track along the medium-opposed surface so as to define a predetermined depth from the medium-opposed surface, and a pair of extended regions connected to opposite ends of the interposed region so as to extend on the plane by a depth larger than the predetermined depth from the medium-opposed surface.

4. A thin film magnetic head comprising:

an upper magnetic pole; and a lower magnetic pole, wherein at least one of the upper and lower magnetic poles includes a magnetic yoke piece exposed at a medium-opposed surface adjacent a gap layer;

a magnetic yoke layer connected to the magnetic yoke piece at a position retracting from the medium-opposed surface, a tip end of said magnetic yoke layer being exposed at the medium-opposed surface; and a non-magnetic layer interposed between the tip end of the magnetic yoke layer and the magnetic yoke piece at the medium-opposed surface, wherein the non-magnetic layer comprises an interposed region extending on a plane in a lateral direction of a data track along the medium-opposed surface so as to define a predetermined depth from the medium-opposed surface, and a pair of extended regions connected to opposite ends of the interposed region so as to extend on the plane by a depth larger than the predetermined depth from the medium-opposed surface.

* * * * *